(12) United States Patent
Milan et al.

(10) Patent No.: US 10,072,664 B2
(45) Date of Patent: Sep. 11, 2018

(54) DEBRIS FILTER FOR MOTOR COOLING INLET ON RAM AIR FAN

(71) Applicant: Hamilton Sundstrand Corporation, Windsor Locks, CT (US)

(72) Inventors: Lucic Milan, East Windsor, CT (US); Robert Telakowski, Windsor Locks, CT (US); Craig M. Beers, Wethersfield, CT (US); John M. Beck, Windsor, CT (US); Darryl A. Colson, West Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1559 days.

(21) Appl. No.: 13/719,529

(22) Filed: Dec. 19, 2012

(65) Prior Publication Data

US 2014/0169944 A1     Jun. 19, 2014

(51) Int. Cl.
*B01D 29/17* (2006.01)
*F04D 19/00* (2006.01)
*F04D 25/06* (2006.01)
*F04D 25/08* (2006.01)
*F04D 29/58* (2006.01)
*F04D 29/70* (2006.01)

(52) U.S. Cl.
CPC ............ *F04D 25/06* (2013.01); *B01D 29/17* (2013.01); *F04D 19/00* (2013.01); *F04D 25/082* (2013.01); *F04D 29/5806* (2013.01); *F04D 29/701* (2013.01)

(58) Field of Classification Search
CPC ... B01D 29/112; B01D 29/114; B01D 29/115; B01D 29/17; B01D 29/336; B64D 13/00; B64D 41/007; B64D 2013/0618; F04D 29/5806; F04D 29/5813; F04D 29/584; F04D 29/5846; F04D 29/588; F04D 29/5886; F04D 19/00; F04D 25/06
USPC ......... 415/116; 417/366, 372; 137/123, 140, 137/150.5
See application file for complete search history.

(56) References Cited

U.S. PATENT DOCUMENTS

| | | | |
|---|---|---|---|
| 3,783,888 A | * | 1/1974 | Johnson ................... 137/145 |
| 4,332,310 A | | 6/1982 | Iwai et al. |
| 4,443,236 A | | 4/1984 | Peiler |

(Continued)

FOREIGN PATENT DOCUMENTS

| | | |
|---|---|---|
| EP | 2677140 A2 | 12/2013 |
| FR | 2433846 A1 * | 3/1980 |

OTHER PUBLICATIONS

European Search Report for European Application No. 13193368.1 dated Jun. 6, 2017.

*Primary Examiner* — Jason Shanske
*Assistant Examiner* — Christopher R Legendre
(74) *Attorney, Agent, or Firm* — Carlson, Gaskey & Olds, P.C.

(57) ABSTRACT

A ram air fan has a fan impeller and a motor. The impeller and motor are mounted within a housing. An inlet header delivers air to an inlet for the fan. An air supply system delivers air from an internal cavity of the inlet header to the motor and air bearings. The air supply system includes a conduit extending through the housing. A connection from the conduit extends from a J-shaped tube mounted within the inlet header. The J-shaped tube extends to a remote end, with a perforated member positioned on the remote end.

6 Claims, 4 Drawing Sheets

(56) References Cited

U.S. PATENT DOCUMENTS

| | | | |
|---|---|---|---|
| 4,589,379 A | | 5/1986 | Fujikawa et al. |
| 4,838,908 A | | 6/1989 | Bader et al. |
| 4,857,175 A | * | 8/1989 | Spinnler .............. B01D 29/115 |
| | | | 175/320 |
| 4,906,262 A | | 3/1990 | Nelson et al. |
| 5,046,458 A | | 9/1991 | Kronich |
| 5,131,807 A | | 7/1992 | Fischer et al. |
| 6,143,020 A | * | 11/2000 | Shigezawa et al. ............ 607/96 |
| 6,994,738 B2 | | 2/2006 | Taddey et al. |
| 7,342,332 B2 | * | 3/2008 | McAuliffe et al. ............. 310/58 |
| 7,394,175 B2 | * | 7/2008 | McAuliffe et al. ............. 310/58 |
| 7,575,421 B2 | * | 8/2009 | McAuliffe et al. ........... 417/366 |
| 8,216,329 B2 | | 7/2012 | McAuliffe et al. |
| 8,226,822 B2 | | 7/2012 | Paradise |
| 8,246,825 B2 | | 8/2012 | Walgren et al. |
| 8,459,966 B2 | * | 6/2013 | Hipsky et al. ................ 417/369 |
| 8,585,374 B2 | * | 11/2013 | Beers et al. .................. 417/368 |
| 8,679,210 B2 | * | 3/2014 | McAuliffe ............. B64D 13/00 |
| | | | 55/306 |
| 9,759,236 B2 | * | 9/2017 | Lucic .................... F04D 29/703 |
| 2004/0003719 A1 | * | 1/2004 | Le ...................... B01D 39/1676 |
| | | | 95/287 |
| 2006/0061222 A1 | | 3/2006 | McAuliffe et al. |
| 2014/0169944 A1 | * | 6/2014 | Milan et al. ............... 415/121.2 |
| 2014/0202121 A1 | * | 7/2014 | Beers et al. .................... 55/306 |
| 2015/0308460 A1 | * | 10/2015 | Lucic .................... B64D 13/00 |
| | | | 415/1 |

* cited by examiner

DEBRIS FILTER FOR MOTOR COOLING INLET ON RAM AIR FAN

BACKGROUND OF THE INVENTION

This application relates to a debris filter incorporated into a reverse facing J-Tube for supplying motor and air bearing cooling air.

In aircraft, one item that operates to supply cooling air on is a ram air fan. The ram air fan is driven by an electrical motor, and acts as the motive force to move air across heat exchangers that expel heat from the aircraft to the outside air environment. The ram air fan is located after the heat exchanger, and pulls air through an inlet header and across heat exchangers, and through an outlet header, downstream of the heat exchangers to an inlet for the fan. The fan then exhausts the air through a ram outlet door on the aircraft.

A tube is placed within the inlet header, and captures a portion of the air which is ported through ducts around the heat exchangers to the ram air fan motor, and its bearings, to cool the motor and bearings.

In the prior art, the tube has sometimes allowed the ingestion of insects, paper, or other types of debris. This debris has sometimes blocked slots within the motor, which is undesirable.

SUMMARY OF THE INVENTION

A ram air fan has a fan impeller and a motor. The impeller and motor are mounted within a housing. An inlet header delivers air to an inlet for the fan impeller. An air supply system delivers air from an internal cavity of the inlet header to the motor and bearings. The air supply system includes a conduit extending through the housing. A connection from the conduit extends from a J-shaped tube mounted within the inlet header. The J-shaped tube extends to a remote end, with a perforated member positioned on the remote end.

These and other features may be best understood from the following specification and drawings, the following which is a brief description.

DETAILED DESCRIPTION

Figure 1A:
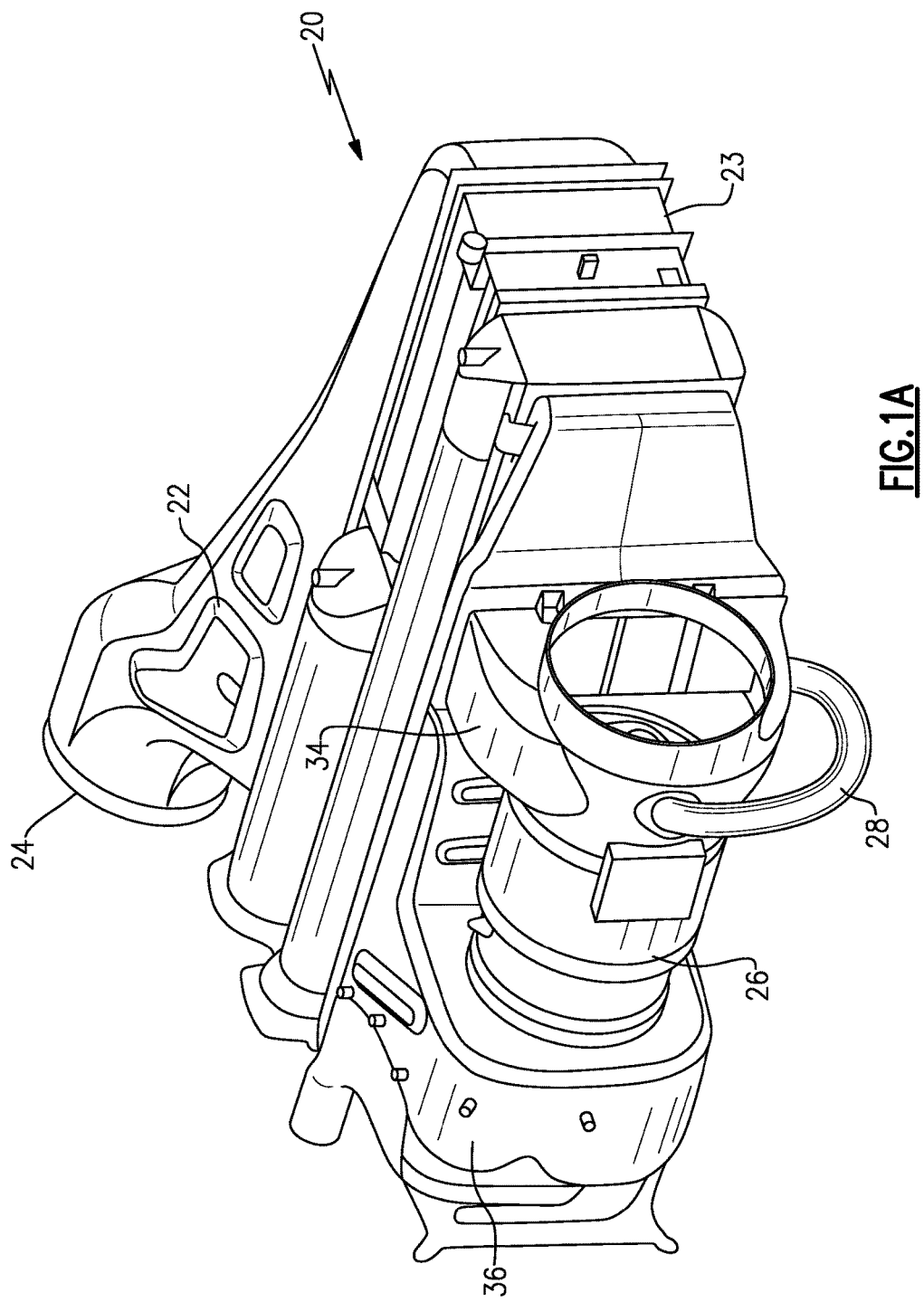
FIG. 1A shows a ram air fan.

FIG. 1A shows a system 20 that incorporates a ram air fan 26. Air enters an inlet 24 of inlet header 22, passes across heat exchangers 23, and is delivered into an inlet 34 for the fan 26. A conduit 28 is shown, and delivers motor and bearing cooling air which is captured by a tube within the header 22, as will be explained below.

Figure 1B:
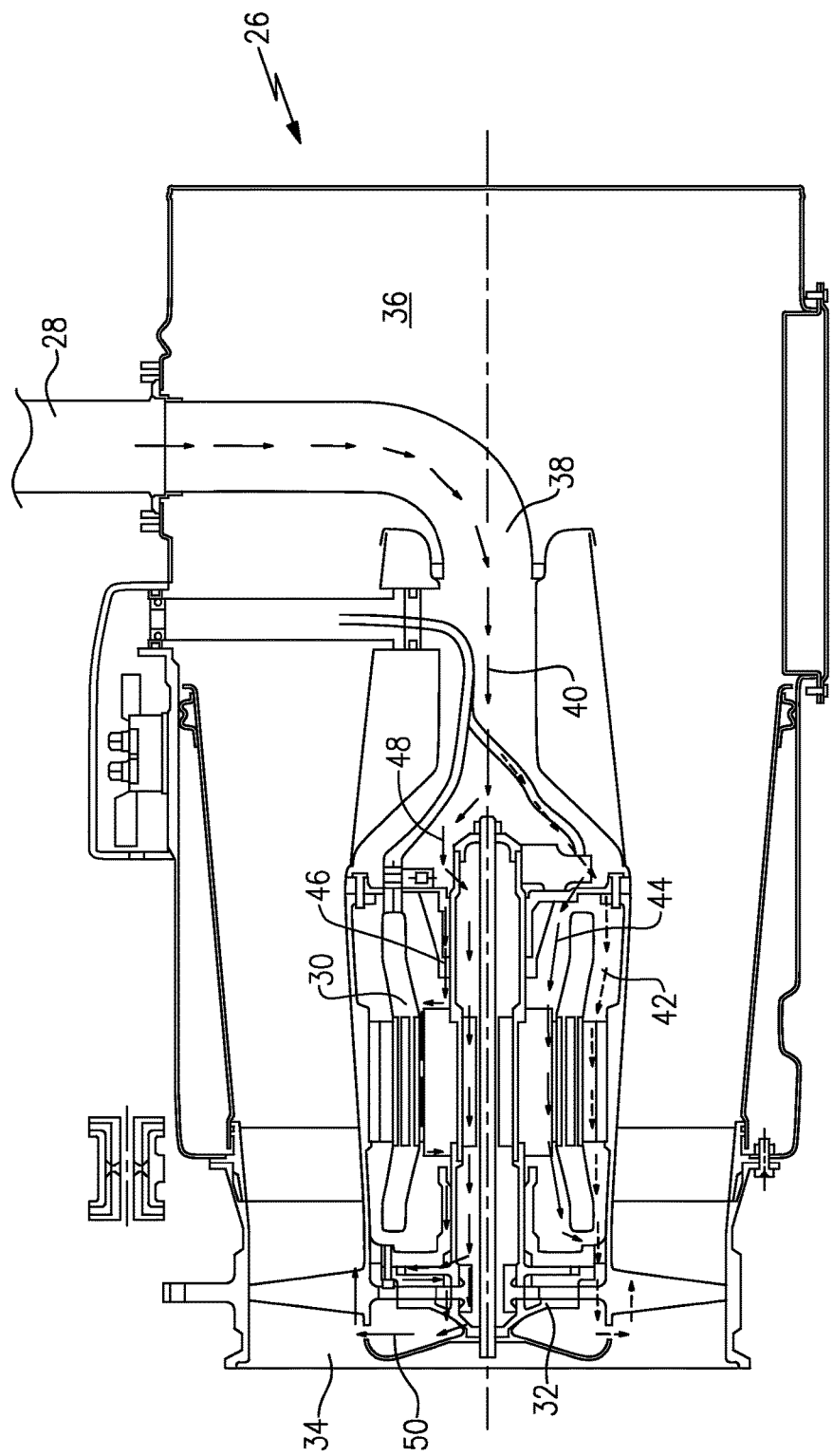
FIG. 1B shows a cross-sectional view through the fan and motor.

As shown in FIG. 1B, the conduit 28 connects to a motor tube 38 which delivers an airstream 40 into various paths 42, 44, 46, and 48, which then cools a motor 30, and its associated bearings. A fan impeller 32 moves air from the inlet 34 to an outlet 36.

Figure 2:
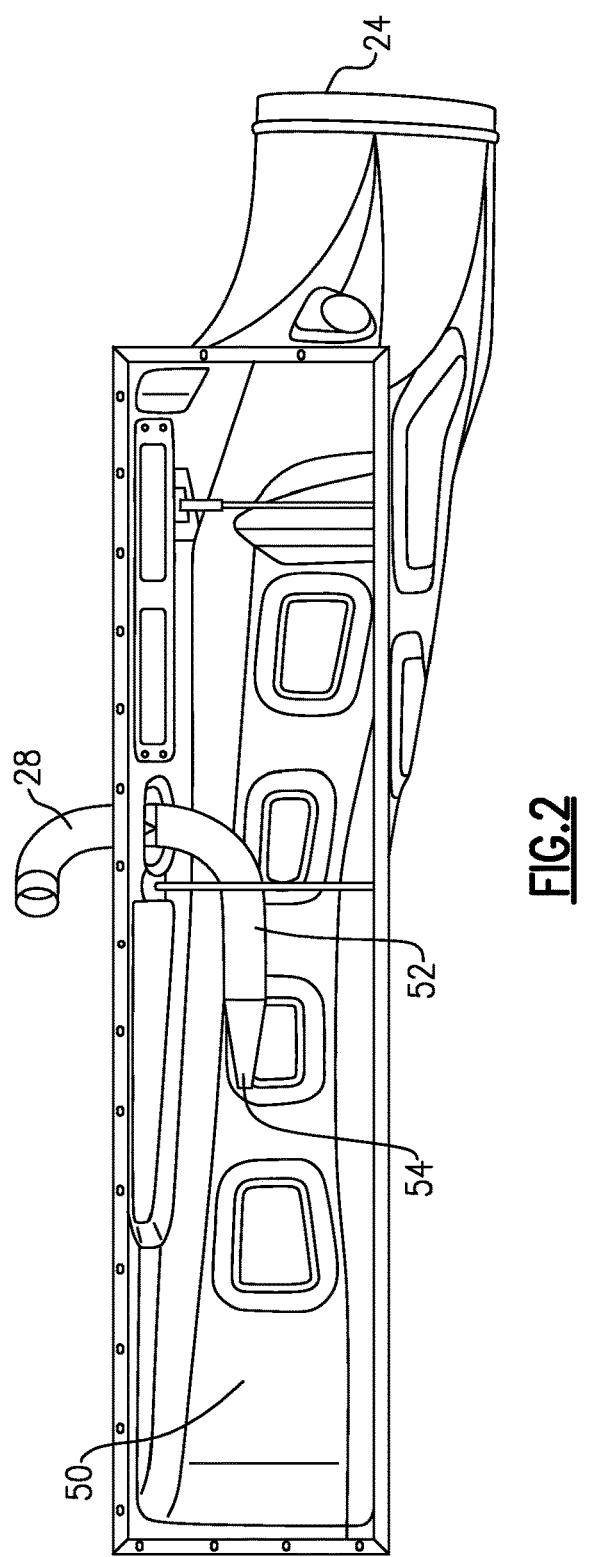
FIG. 2 shows an underside of an inlet header.

FIG. 2 shows an underside of the inlet header 22, and a portion of conduit 28 which, extends to the motor, as shown in the earlier figures. A J-shaped tube 52 is positioned within the header 22. A perforated conical cone 54 on the end of the J-shaped tube 52 sits within a cavity 50 of the inlet header 22. The tube faces in a downstream direction, as the air enters the header from an inlet 24 and flows into the cavity 50.

Figure 3A:
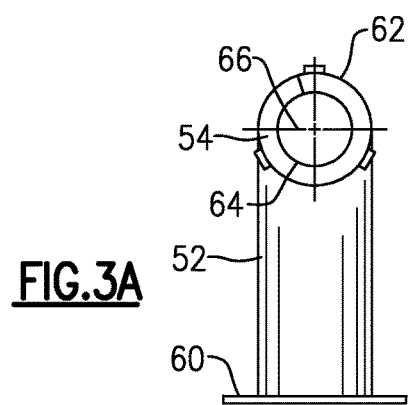
FIG. 3A is a first view of an inlet tube.

FIG. 3A shows the J-shaped tube 52 having a perforated conical filter 54 at a remote inlet end. A base 60 is to be secured to the wall of the header 24. The perforated conical filter 54 extends from a larger end 62 which is connected to the tube 52 to a smaller downstream end 64. The end 66 is left open.

Figure 3B:
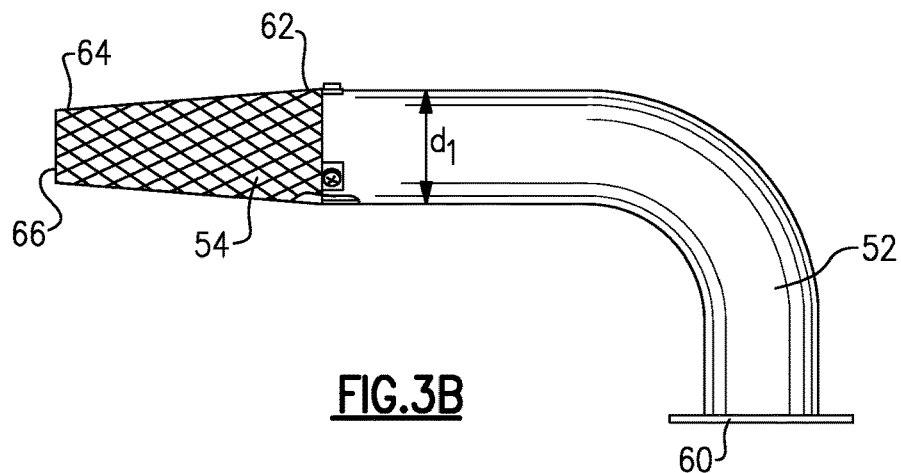
FIG. 3B is a side view of the inlet tube.
Figure 3C:
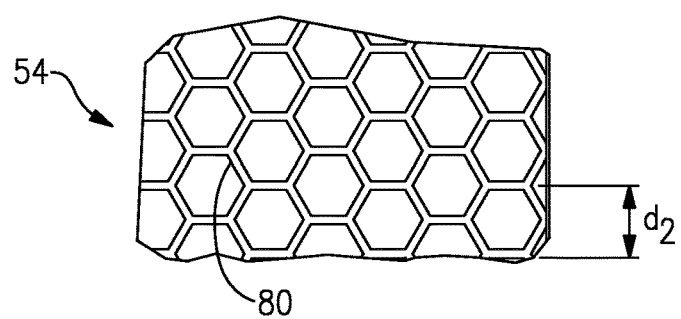
FIG. 3C shows a detail.

As shown in FIG. 3B, the conical filter 54 is formed with perforations, which generally have a shape as shown in FIG. 3C. As shown in FIG. 3C, the openings are hexagonal, and generally provide a perforated sheet. The perforations are attached to, or are an integral part of, the tube 52.

In an embodiment, an inner diameter $d_1$ of the tube 52 was 2.5 inch. The $d_1$ is also the diameter of the larger end 62 of perforated conical filter 54. The end 62 of the conical filter 54 is also approximately 2.5 inch (6.35 cm). The smaller end 64 is 1.6 inch. A ratio of the diameter of the remote smaller end 64 to the diameter of connection end 62 was between 0.606 and 0.741.

As shown in FIG. 3C, a largest size $d_2$ of the openings 80 was 0.25 inch (0.635 cm). A ratio of $d_2$ to $d_1$ was between 0.08 and 0.12.

As can be appreciated from FIGS. 3A, 3B, and 3C, the open end 66 has an inner diameter equal to the diameter at smaller end 64. Thus, the size of the open end 66 is greater than the size of the openings 80. The open end 66 is generally a cylindrical opening defining a forward end of the filter 54.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A ram air fan comprising:
    a fan impeller and a motor for driving said fan impeller, said fan impeller and said motor being mounted within a housing;
    an inlet header for delivering air to an inlet for said fan impeller;
    an air supply system for delivering air from an internal cavity of said inlet header to the motor, said air supply system including a conduit extending through said housing, a connection from said conduit to a J-shaped tube mounted within said inlet header, and said J-shaped tube connected to said conduit at an inner wall of said inlet header, and extending to a remote end, with a perforated member positioned on said remote end; and
    said perforated member extending to a remote end thereof which is open, and said perforated member having a plurality of openings, with a size of said open remote end being greater than a size of said plurality of openings.

2. The ram air fan as set forth in claim 1, wherein said perforated member is conical, and has a larger diameter portion connected to said J-shaped tube, and a smaller diameter portion at said open remote end.

3. The ram air fan as set forth in claim 2, wherein a ratio of a diameter at said smaller diameter portion to a diameter at said larger diameter portion is between 0.606 and 0.741.

4. The ram air fan as set forth in claim 1, wherein the plurality of openings in said perforated member are hexagonal.

5. The ram air fan as set forth in claim 1, wherein a largest dimension of said plurality of openings is defined as a first dimension, and an inner diameter of said J-shaped tube at the remote end thereof is defined as a second dimension, and a ratio of said first dimension to said second dimension is between 0.08 and 0.12.

6. The ram air fan as set forth in claim 1, wherein said open remote end is cylindrical and defines a forward end of said perforated member.

* * * * *